(12) United States Patent
Otsuki et al.

(10) Patent No.: US 10,901,069 B2
(45) Date of Patent: Jan. 26, 2021

(54) ACTIVITY RECOGNITION SYSTEM AND ACTIVITY RECOGNITION METHOD

(71) Applicant: KEIO UNIVERSITY, Tokyo (JP)

(72) Inventors: Tomoaki Otsuki, Kanagawa (JP); Yugo Agata, Kanagawa (JP)

(73) Assignee: Keio University, Tokyo (JP)

( * ) Notice: Subject to any disclaimer, the term of this patent is extended or adjusted under 35 U.S.C. 154(b) by 308 days.

(21) Appl. No.: 15/925,908

(22) Filed: Mar. 20, 2018

(65) Prior Publication Data

US 2018/0284223 A1  Oct. 4, 2018

(30) Foreign Application Priority Data

Mar. 31, 2017  (JP) ................................ 2017-069698

(51) Int. Cl.
  *G01S 7/41*  (2006.01)
  *G01S 13/00*  (2006.01)
  *G08B 21/04*  (2006.01)
  *G01S 13/88*  (2006.01)

(52) U.S. Cl.
  CPC .............. *G01S 7/415* (2013.01); *G01S 7/412* (2013.01); *G01S 13/003* (2013.01); *G08B 21/043* (2013.01); *G08B 21/0423* (2013.01); *G01S 13/886* (2013.01)

(58) Field of Classification Search
  CPC . G01S 7/41; G01S 7/411; G01S 7/412; G01S 7/415; G01S 7/4802; G01S 7/4808
  USPC ............................................ 342/196, 84, 99
  See application file for complete search history.

(56) References Cited

U.S. PATENT DOCUMENTS

| | | | | |
|---|---|---|---|---|
| 7,339,518 B2* | 3/2008 | Natsume | ................... | G01S 7/36 342/70 |
| 10,531,817 B2* | 1/2020 | Zhang | ................... | H04B 17/336 |
| 2012/0206288 A1* | 8/2012 | Murakami | .............. | G01S 7/415 342/27 |
| 2013/0002434 A1* | 1/2013 | Cuddihy | .............. | G08B 21/043 340/573.7 |
| 2016/0379475 A1* | 12/2016 | Zack | ....................... | G01S 13/62 342/21 |

(Continued)

OTHER PUBLICATIONS

Y.Hino, J. Hong, and T. Ohtsuki, "Activity Recognition Using Array Antenna", Communications (ICC), 2015 IEEE International Conference, pp. 507-511, Jun. 2015.

*Primary Examiner* — Erin F Heard
*Assistant Examiner* — Michael W Justice
(74) *Attorney, Agent, or Firm* — IPUSA, PLLC

(57) ABSTRACT

An activity recognition system for identification of an activity of a subject includes a transmitter configured to transmit a radio wave, a receiver configured to receive the radio wave by an array antenna, a feature quantity extracting part configured to extract a feature quantity from a signal received by the array antenna, and an identifying part configured to identify the activity based on the feature quantity, wherein the feature quantity extracting part is configured to calculate a first feature quantity that represents a change of the signal by using a signal received at an observation start time point as a reference signal and to calculate a second feature quantity that represents a change of the signal by using an immediately preceding signal as a reference signal, and the identifying part is configured to identify the activity based on the first feature quantity and the second feature quantity.

4 Claims, 23 Drawing Sheets

(56) References Cited

U.S. PATENT DOCUMENTS

2018/0081052 A1\* 3/2018 Sakamaki ............... G01S 7/415

\* cited by examiner

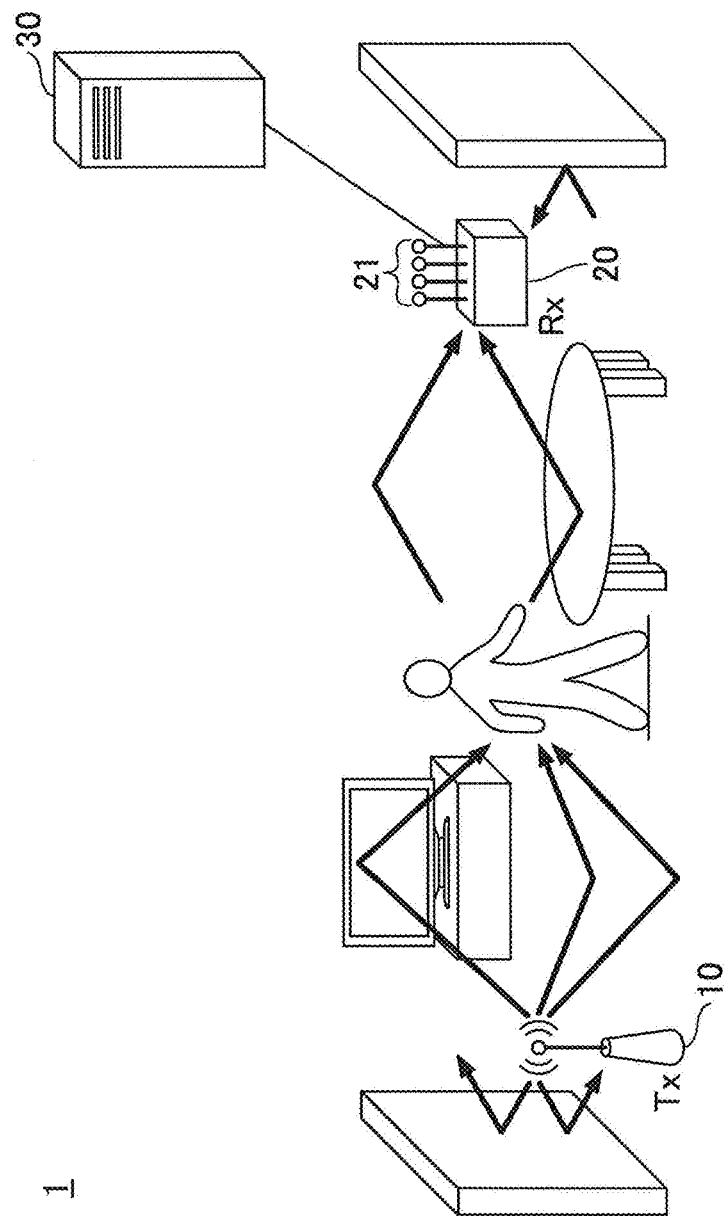

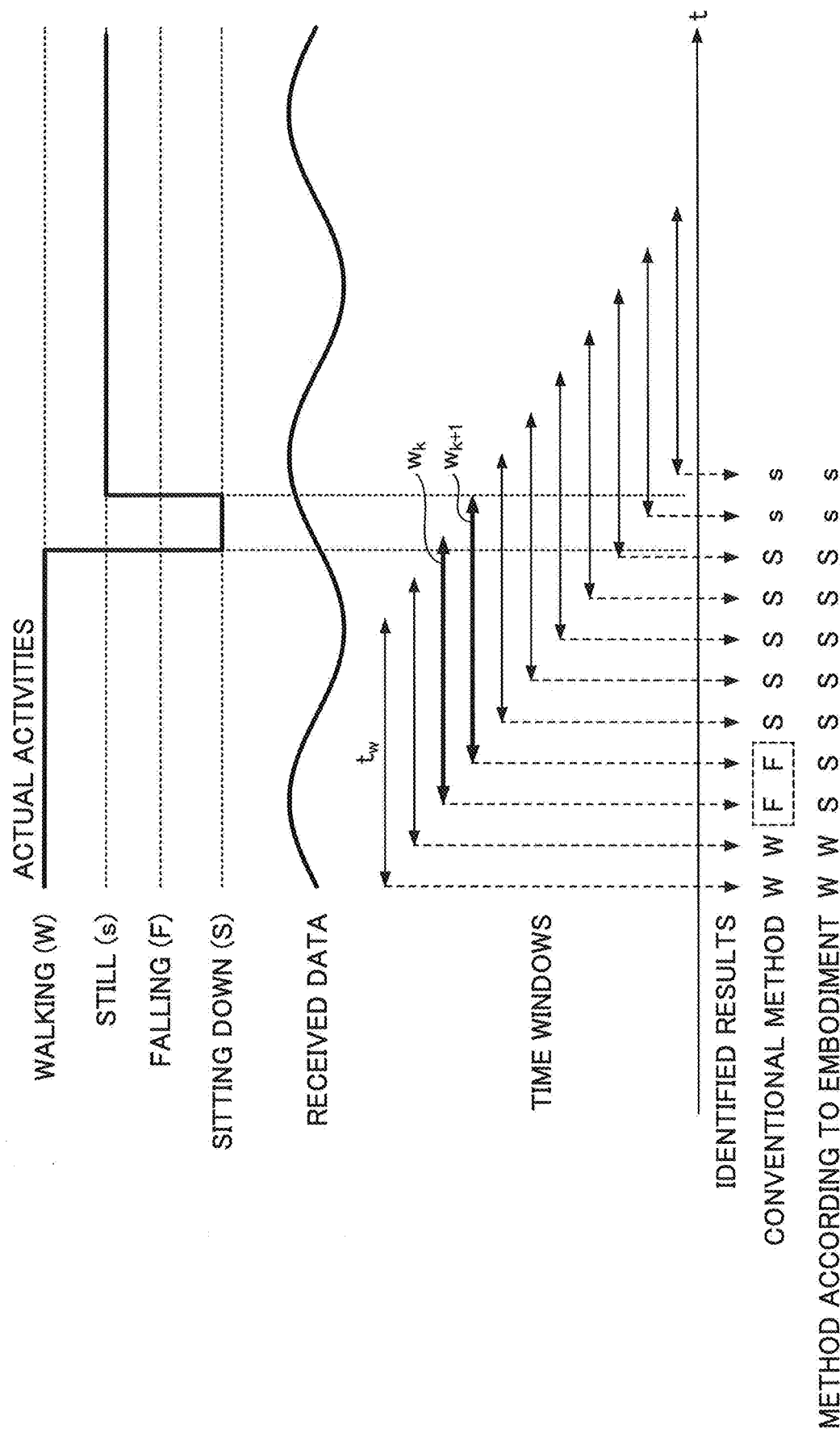

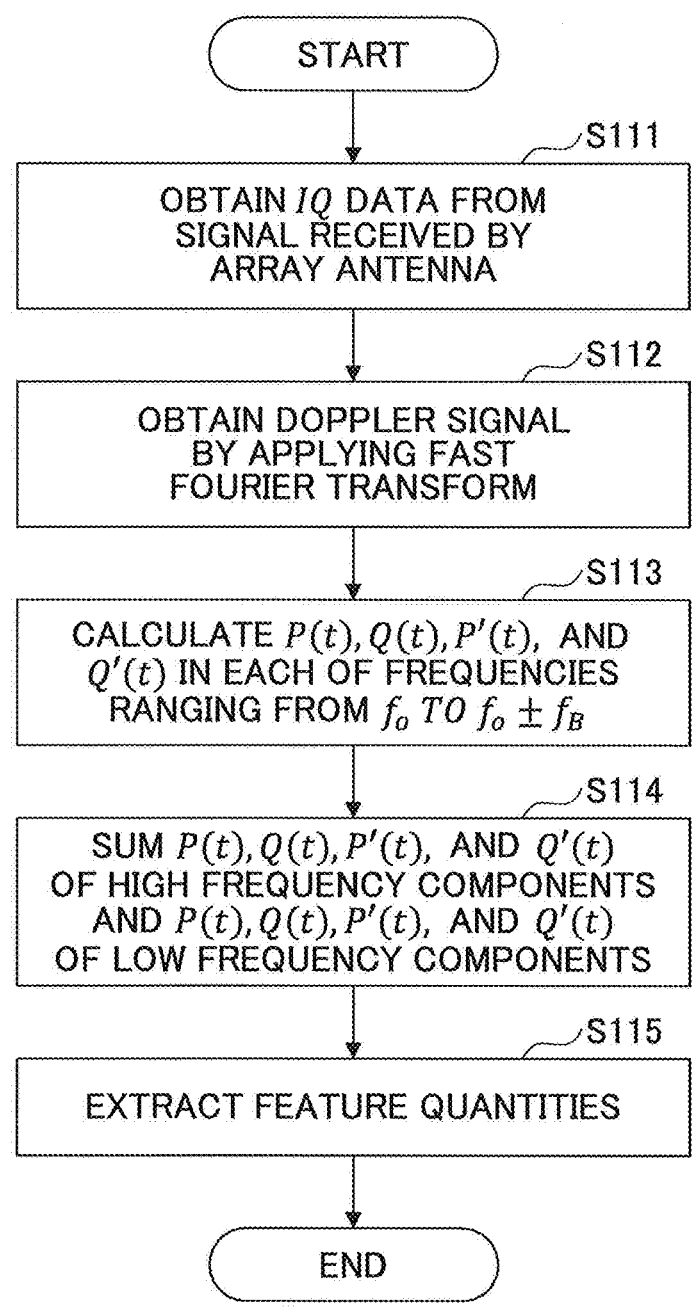

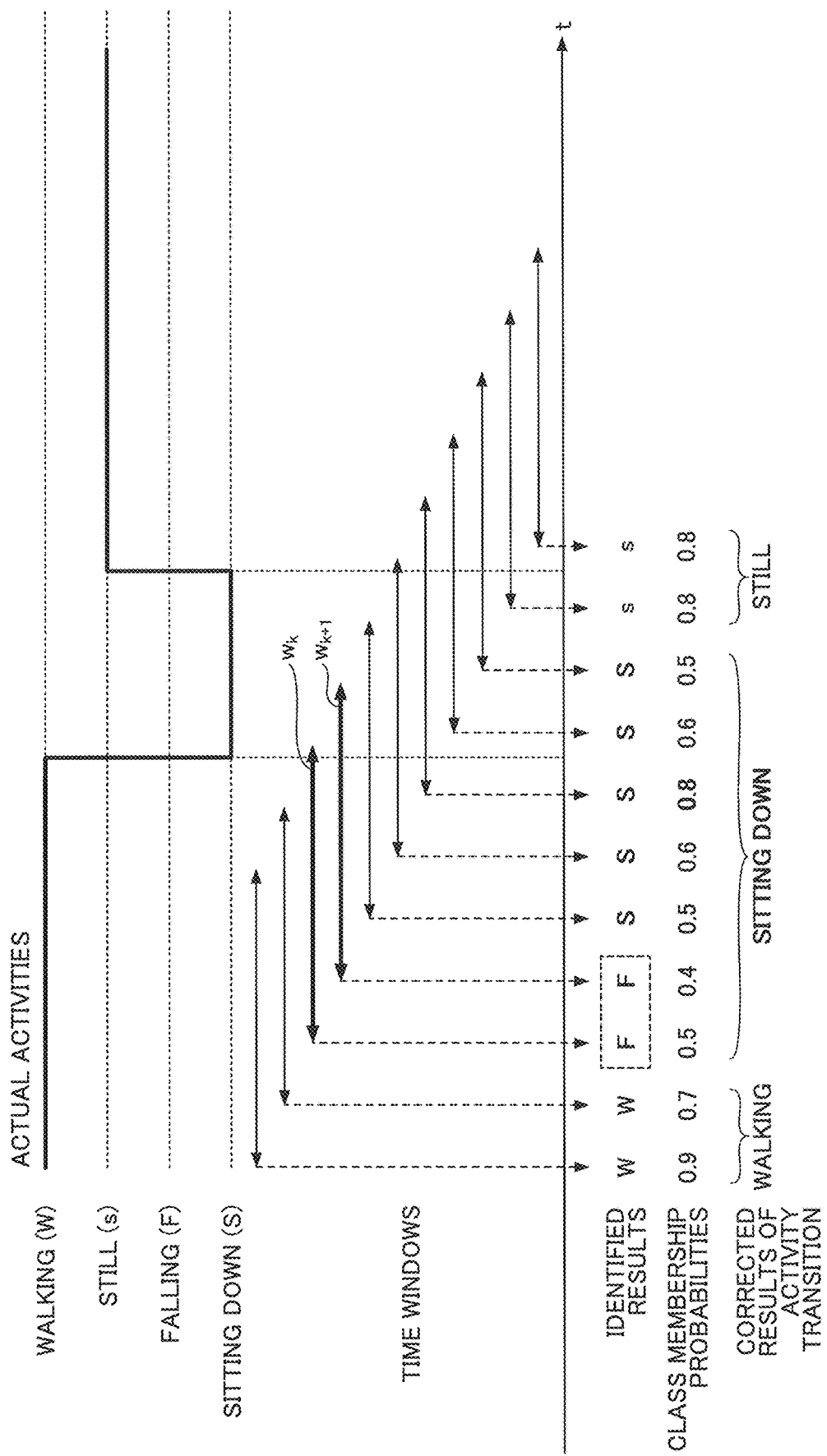

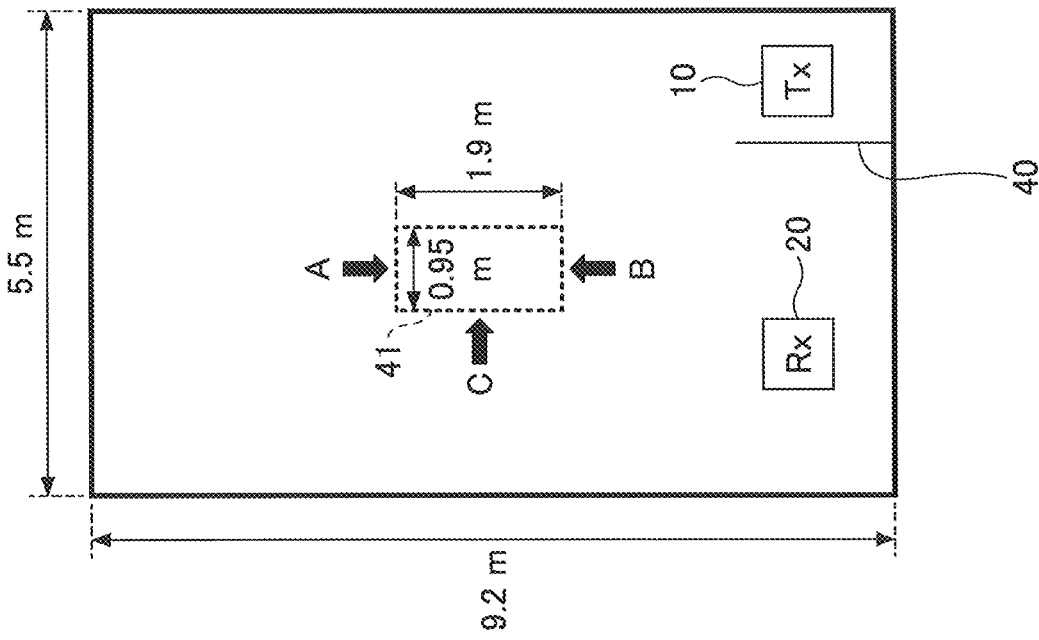
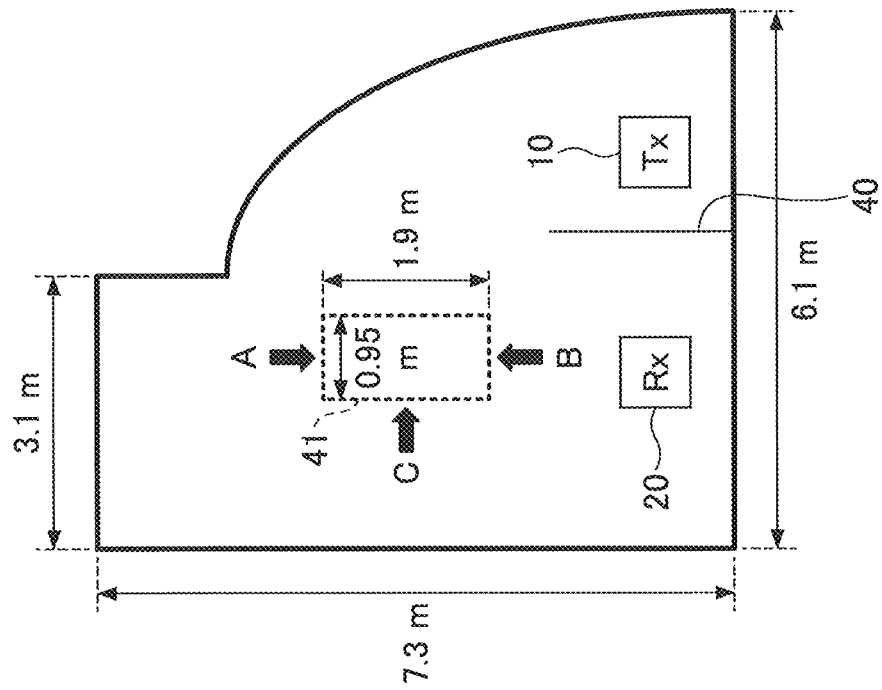

FIG.11

· PARAMETERS USED IN EXPERIMENT

| NUMBER OF ANTENNA ELEMENTS | 4 |
|---|---|
| SAMPLING FREQUENCY | $4\,kHz$ |
| TRANSMITTER FREQUENCY $f_o$ | $2.47\,GHz$ |
| NUMBER OF SUBJECTS | 4 |
| TIME WINDOWS WIDTH ($t_w$) | $3\,sec$ |
| DOPPLER FREQUENCY | $f_o \pm 80\,Hz$ |
| IMMEDIATELY PRECEDING SIGNALS USED TO CALCULATE $P'(t)$ AND $Q'(t)$ | SIGNALS RECEIVED 0.1, 0.5, 1.0, AND 1.5 SECONDS EARLIER ($t - 0.1, t - 0.5, t - 1.0, t - 1.5$) |

TYPES OF ACTIVITIES

| \multicolumn{2}{c|}{TYPES OF ACTIVITIES} |
|---|---|
| FALL | FALLING AFTER STANDING STILL |
|  | FALLING AFTER WALKING |
| NON-FALL | SITTING DOWN AFTER STANDING STILL |
|  | SITTING DOWN AFTER WALKING |
|  | WALKING 1 |
|  | WALKING 2 |
|  | SITTING ON FLOOR AFTER WALKING |
|  | LYING ON FLOOR AFTER WALKING |
|  | STILL |

FIG.14A

METHOD ACCORDING TO EMBODIMENT

| | | FALL DETECTION ACCURACY 281/288 (97.6%) | IDENTIFIED ACTIVITIES | |
|---|---|---|---|---|
| | | | FALL | NON-FALL |
| ACTUAL ACTIVITIES | FALL | FALLING AFTER STANDING STILL | 97.2% (35/36) | 2.8% |
| | | FALLING AFTER WALKING | 98.6% (71/72) | 1.4% |
| | NON-FALL | SITTING DOWN AFTER STANDING STILL | 0% | 100% (12/12) |
| | | SITTING DOWN AFTER WALKING | 4.2% | 95.8% (23/24) |
| | | WALKING 1 | 0% | 100% (72/72) |
| | | WALKING 2 | 0% | 100% (3/12) |
| | | SITTING ON FLOOR AFTER WALKING | 0% | 100% (12/12) |
| | | LYING ON FLOOR AFTER WALKING | 33.4% | 66.6% (8/12) |
| | | STILL | 0% | 100% (36/36) |

FIG.14B

COMPARATIVE EXAMPLE: CONVENTIONAL METHOD

| | | | IDENTIFIED ACTIVITIES | |
|---|---|---|---|---|
| | | FALL DETECTION ACCURACY 228/288 (79.2%) | FALL | NON-FALL |
| ACTUAL ACTIVITIES | FALL | FALLING AFTER STANDING STILL | 86.1% (31/36) | 13.9% |
| | | FALLING AFTER WALKING | 76.3% (55/72) | 23.7% |
| | NON-FALL | SITTING DOWN AFTER STANDING STILL | 41.7% | 58.3% (7/12) |
| | | SITTING DOWN AFTER WALKING | 71.8% | 29.2% (7/24) |
| | | WALKING 1 | 5.6% | 94.4% (68/72) |
| | | WALKING 2 | 8.3% | 91.7% (11/12) |
| | | SITTING ON FLOOR AFTER WALKING | 25.0% | 75.0% (9/12) |
| | | LYING ON FLOOR AFTER WALKING | 66.7% | 33.3% (4/12) |
| | | STILL | 0% | 100% (36/36) |

FIG.15A

METHOD ACCORDING TO EMBODIMENT

| FALL DETECTION ACCURACY OF METHOD ACCORDING TO EMBODIMENT 162/168 (96.4%) | | IDENTIFIED RESULTS | |
|---|---|---|---|
| | | FALL | NON-FALL |
| ACTUAL ACTIVITY TRANSITION PATTERNS | INCLUDING FALLS | 99.1% (107/108) | 0.9% (1/108) |
| | NOT INCLUDING FALLS | 8.3% (5/60) | 91.7% (55/60) |

FIG.15B

CONVENTIONAL METHOD

| FALL DETECTION ACCURACY OF CONVENTIONAL METHOD 147/168 (87.5%) | | IDENTIFIED RESULTS | |
|---|---|---|---|
| | | FALL | NON-FALL |
| ACTUAL ACTIVITY TRANSITION PATTERNS | INCLUDING FALLS | 100% | 0% |
| | NOT INCLUDING FALLS | 45% | 65% |

| THRESHOLDS FOR CORRECTING ACTIVITIES | TYPES OF ACTIVITIES | THRESHOLDS |
|---|---|---|
| FALL | FALLING AFTER STANDING STILL | 10 |
| | FALLING AFTER WALKING | 10 |
| NON-FALL | SITTING DOWN AFTER STANDING STILL | 5 |
| | SITTING DOWN AFTER WALKING | 5 |
| | WALKING 1 | 1 |
| | WALKING 2 | 1 |
| | SITTING ON FLOOR AFTER WALKING | 5 |
| | LYING ON FLOOR AFTER WALKING | 5 |
| | STILL | 1 |

FIG.15C

WHEN ACTIVITY TRANSITION IS NOT CORRECTED

| FALL DETECTION ACCURACY 108/168 (60.0%) | | IDENTIFIED RESULTS | |
|---|---|---|---|
| | | FALL | NON-FALL |
| ACTUAL ACTIVITY TRANSITION PATTERNS | INCLUDING FALLS | 100% | 0% |
| | NOT INCLUDING FALLS | 100% | 0% |

FIG.16A

| FEATURE QUANTITIES | FALL DETECTION ACCURACY |
|---|---|
| CONVENTIONAL METHOD | 79.17% |

EFFECT OF USING EVALUATION FUNCTIONS CALCULATED IN DOPPLER REGION

| FEATURE QUANTITIES | FALL DETECTION ACCURACY |
|---|---|
| $P(t), Q(t)$ | 92.01% |

FIG.16B

EFFECT OF USING FEATURE QUANTITIES REPRESENTING CHANGES FROM IMMEDIATELY PRECEDING SIGNALS

| FEATURE QUANTITIES | FALL DETECTION ACCURACY |
|---|---|
| $P'(t), Q'(t)$ (0.1 SECONDS EARLIER) | 85.41% |
| $P'(t), Q'(t)$ (0.5 SECONDS EARLIER) | 95.44% |
| $P'(t), Q'(t)$ (1.0 SECONDS EARLIER) | 93.10% |
| $P'(t), Q'(t)$ (1.5 SECONDS EARLIER) | 93.75% |
| ALL | 97.57% |

FIG.17

| FALL DETECTION ACCURACY | | $N_t$ | | | |
|---|---|---|---|---|---|
| | | 1 | 3 | 6 | 10 |
| $N_f$ | 1 | – | 87.50% | 88.89% | 89.93% |
| | 2 | 85.42% | 94.44% | 95.14% | 94.10% |
| | 4 | 91.32% | 96.18% | 96.52% | 95.83% |
| | 5 | 92.01% | 97.57% | 97.57% | 97.22% |

$N_t$: NUMBER OF DIVIDED REGIONS IN TIME DIRECTION
$N_f$: NUMBER OF DIVIDED REGIONS IN FREQUENCY DIRECTION

ACTIVITY RECOGNITION SYSTEM AND ACTIVITY RECOGNITION METHOD

CROSS-REFERENCE TO RELATED APPLICATION

The present application is based upon and claims priority to Japanese Patent Application No. 2017-069698, filed on Mar. 31, 2017, the entire contents of which are incorporated herein by reference.

BACKGROUND OF THE INVENTION

1. Field of the Invention

The disclosures herein generally relate to an activity recognition technique, and more specifically, to a scheme and a method for activity recognition using an array antenna.

2. Description of the Related Art

With the expanding aging population worldwide, the number of elderly people is on the increase, and further, there are many elderly people who live alone. As a system that monitors elderly people living alone, a method for identifying four situations that are falling, sitting down, walking, and being still by using an array antenna has been proposed (see Non-Patent Document 1, for example). Such a fall detection system using an array antenna detects falls by observing changes in radio wave propagation between a transmitter and a receiver. As the fall detection system using an array antenna does not use image data, the system is suitable to protect privacy of a person observed. Also, unlike wearable sensors, less physical burden is given to the person observed.

In order to estimate activity transition, the conventional method using an array antenna extracts feature quantities from received data by shifting a time window. When the time window includes only a part of an activity, it is difficult to clearly distinguish the activity, and thus false recognition sometimes occurs. In Non-Patent Document 1, in order to minimize false recognition, thresholds are set for respective activities. When the number of times an identified activity continues is equal to or less than a threshold, the result of the identified activity is corrected.

However, such experimental thresholds are required to be preliminarily set for respective activities, requiring complicated processing. Also, even if an identified result is corrected by using the preliminarily set experimental threshold, it is still difficult to detect falling after walking with high accuracy. Changes observed over time in radio wave propagation are assumed to be small when a person falls after walking, as compared to when a person falls after standing still. Accordingly, it is desired to provide a technique that allows activity transition including falling after walking to be recognized with high accuracy.

RELATED-ART DOCUMENTS

Non-Patent Document

[Non-Patent Document 1] Y. Hino, J. Hong, and T. Ohtsuki, "Activity recognition using array antenna", Communications (ICC), 2015 IEEE International Conference, pp. 507-511, June 2015

SUMMARY OF THE INVENTION

It is an object of one aspect of the present invention to provide an activity recognition technique that allows activity transition to be recognized with high accuracy.

According to an aspect of an embodiment, an activity recognition system for identification of an activity of a subject includes a transmitter configured to transmit a radio wave, a receiver configured to receive the radio wave by an array antenna, a feature quantity extracting part configured to extract a feature quantity from a signal received by the array antenna, and an identifying part configured to identify the activity based on the feature quantity, wherein the feature quantity extracting part is configured to calculate a first feature quantity that represents a change of the signal by using a signal received at an observation start time point as a reference signal and to calculate a second feature quantity that represents a change of the signal by using an immediately preceding signal as a reference signal, and the identifying part is configured to identify the activity based on the first feature quantity and the second feature quantity.

According to an aspect of the embodiment, an activity recognition system for identification of an activity of a subject includes a transmitter configured to transmit a radio wave, a receiver configured to receive the radio wave by an array antenna, a feature quantity extracting part configured to extract a feature quantity from a signal received by the array antenna, and an identifying part configured to identify the activity based on the feature quantity, wherein the feature quantity extracting part is configured to convert the signal received by the array antenna into a frequency domain signal, and calculate a two-dimensional feature quantity that represents a signal change both in a time direction and in a frequency direction, and the identifying part is configured to identify the activity based on the two-dimensional feature quantity.

According to an aspect of the embodiment, an activity recognition system for identification of an activity of a subject includes a transmitter configured to transmit a radio wave, a receiver configured to receive the radio wave by an array antenna, a feature quantity extracting part configured to extract a feature quantity from a signal received by the array antenna, an identifying part configured to identify the activity based on the feature quantity by using a classifier, and a correcting part configured to correct an identified result by the identifying part, wherein the identifying part is configured to output, at a predetermined time interval, the identified result, which indicates an activity having a class membership probability, and the correcting part is configured to apply, in response to an event in which activity transition estimated as incorrect recognition is included in the identified result, at least one of a first rule in which, in response to the class membership probability being less than 0.5, the identified result at a given time point is replaced by an activity identified at a time point immediately before the given time point in the predetermined time interval, a second rule in which, in response to the identified result excluding a specific activity and being followed immediately by the specific activity, the identified result excluding the specific activity is replaced by the specific activity, and a third rule in which, in response to unlikely activity transition being estimated, all activities included in the activity transition are replaced by an activity having the highest class membership probability in the activity transition.

Other objects and further features of the present invention will be apparent from the following detailed description when read in conjunction with the accompanying drawings.

BRIEF DESCRIPTION OF THE DRAWINGS

FIGS. 1A and 1B are schematic diagrams illustrating an activity recognition system to which an embodiment of the present invention is applied;

FIG. 3 is a drawing illustrating an example of estimated activity transition.

FIG. 4 is a flowchart illustrating a feature quantity extracting process.

FIG. 9 is a drawing illustrating correction of an identified result;

FIGS. 10A and 10B are drawings illustrating environments used in an experiment;

FIG. 11 is a drawing illustrating parameters used in the experiment;

FIGS. 14A and 14B illustrate effects of identifying respective activities by a method according to the embodiment compared to a conventional method;

FIGS. 15A through 15C are drawings illustrating effects of correcting activity transition patterns by the method according to the embodiment compared to the conventional method;

FIGS. 16A and 16B are drawings illustrating effects of using feature quantities according to the embodiment;

FIG. 17 is a drawing illustrating an effect of dividing a Doppler region;

DESCRIPTION OF THE PREFERRED EMBODIMENTS

In the following, embodiments of the present invention will be described with reference to the accompanying drawings.

According to an embodiment, new effective methods are provided in each of the following two stages.
(1) Activity recognition, and
(2) Correction of identified results As the first point of the activity recognition stage, the activity recognition uses feature quantities that represent not only changes in radio wave propagation from a signal received at a reference time point (an observation start time point), but also changes in radio wave propagation from a signal received immediately before. By using such an immediately preceding signal, changes in radio wave propagation observed during an activity can be extracted in more detail.

As the second point of the activity recognition stage, the activity recognition uses feature quantities that represent changes in a frequency direction by analyzing Doppler signals. By extracting changes in a frequency domain, features of the received signal can be two-dimensionally observed, enabling a more accurate activity analysis.

In the correction stage of identified results, in a case where unlikely activity transition is estimated, the unlikely activity transition is corrected to an activity having the highest class membership probability. A class membership probability refers to the degree of certainty of a result identified by a classifier. By correcting the activity transition estimated as incorrect recognition to an activity having the highest class membership probability, it is possible to improve the accuracy of activity recognition without setting experimental thresholds for respective activities.

Activity recognition using the feature quantities and correction of identified results both show effectiveness. After the activity recognition according to an embodiment is performed, a known or a generally common correction method may be performed. Alternatively, after the known or the generally common correction method is performed, the activity recognition according to the embodiment may be performed.

In the activity recognition stage, extraction of feature quantities by using evaluation functions based on an immediately preceding signal as a reference signal and extraction of feature quantities by using the Doppler analysis both show effectiveness. By performing at least one of the above-described extraction approaches, it is possible to improve the accuracy of the activity recognition.

<Activity Recognition Stage>

Figure 1B:
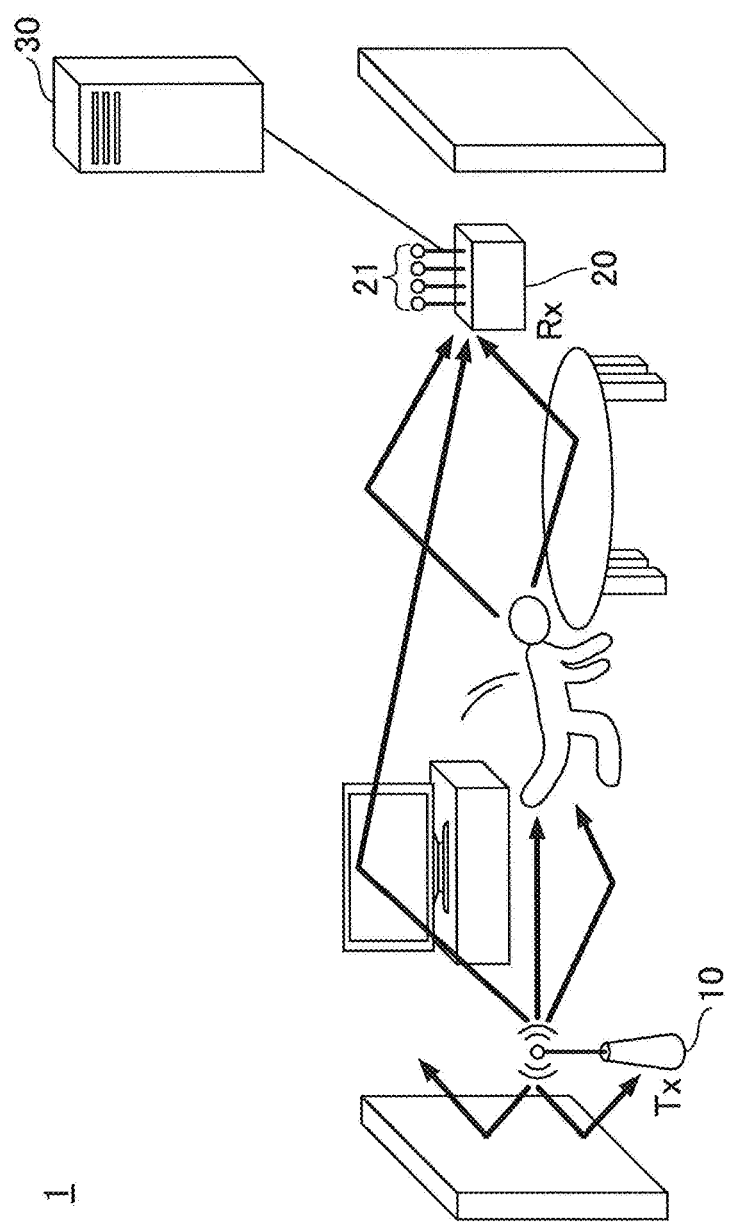

FIGS. 1A and 1B are schematic diagrams illustrating an activity recognition system 1 to which an embodiment of the present invention is applied. The activity recognition system 1 includes a transmitter 10, a receiver 20 equipped with an array antenna 21, and an information processing apparatus 30 coupled to the receiver 20. The transmitter 10 transmits radio waves in accordance with a radio communication standard such as a wireless LAN and Bluetooth (registered trademark). The transmitted radio waves are propagated through multiple transmission paths (a multipath) according to the configuration of a room and the presence of a person and the like. The array antenna 21 has an $L^{th}$ number of antenna elements (four antenna elements in examples of FIGS. 1A and 1B), and the respective antenna elements receive radio waves of different phases. The information processing apparatus 30 analyzes the propagation state of the radio waves by observing the strength and the direction of arrival of the received signals.

The propagation state of radio waves in a multipath environment differs between when a person is walking in the room as illustrated in FIG. 1A and when the person has fallen down as illustrated in FIG. 1B. By observing changes in the radio wave propagation and the received signal strength, the person's activity can be identified. As people often change directions while walking, it may be difficult to distinguish between walking and falling when a time window includes only a part of an activity. In the present embodiment, new evaluation functions that use an immediately preceding signal as a reference signal are applied. Further, it is possible to improve the accuracy of distinguishing between walking and falling by using feature quantities that represent changes from the immediately preceding signal. Also, by analyzing Doppler signals, feature quantities representing changes in the frequency direction are used, allowing an activity to be two-dimensionally recognized in the time domain and in the frequency domain. Further, when an identified result includes activity transition that is unlikely under normal circumstances, the identified result is corrected by using class membership probabilities by a classifier.

The activity recognition and the correction of identified results based on extracted feature quantities are performed by the information processing apparatus 30. The information processing apparatus 30 is not necessarily required to be provided separately from the receiver 20. The information processing apparatus 30 may be integrated with the receiver 20. Alternatively, the receiver 20 may include processing capabilities of the information processing apparatus 30. The information processing apparatus 30 identifies an activity by processing and analyzing signals received by the array antenna and corrects identified results if necessary.

Figure 2:
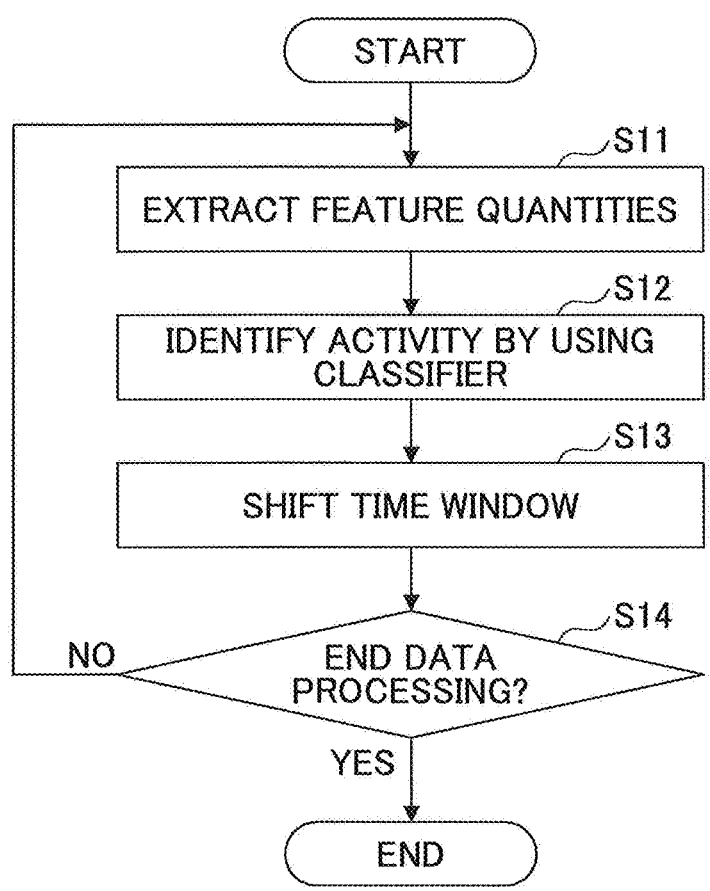
FIG. 2 is a flowchart illustrating an activity recognition method according to the embodiment.

FIG. 2 is a flowchart illustrating an activity recognition method according to the embodiment. A processing flow in FIG. 2 is performed for each time window. A time window can be appropriately set. For example, a window width ($t_w$) of 3 seconds and a window shift (slide) width of 0.1 seconds are set. First, the window number is set to an initial value and feature quantities are extracted from received data in a current time window (S11). In order to calculate feature quantities, four evaluation functions, which will be described below, are used.

The first two evaluation functions are given by a formula (1) and a formula (2).

$$P(t) = |v_o \cdot v(t)| \tag{1}$$

$$Q(t) = \frac{|\lambda(t) - \lambda_o|}{\lambda_o} \tag{2}$$

P(t) is an evaluation function indicating changes in radio wave propagation from an observation start time point, wherein vector $v_0$ is a first eigenvector of a signal received at the observation start time point, and vector v(t) is a first eigenvector of a signal at a time point t. As a value of the evaluation function P(t) becomes closer to 1, a change in the radio wave propagation becomes smaller. Q(t) is an evaluation function indicating changes in received signal strength (RSS), wherein $\lambda_0$ is a first eigenvalue of the signal received at the observation start time point, and $\lambda(t)$ is a first eigenvalue of a signal received at a time point t. As a value of the evaluation function Q(t) becomes closer to 1, a change in the received signal strength becomes smaller. As the value of the evaluation function Q(t) becomes lower, a change in the received signal strength becomes larger.

Feature quantities calculated by the evaluation functions of the formula (1) and the formula (2) are used in the conventional method. In the conventional method, focus is only on changes in a signal from a start point of each time window. Feature quantities calculated by the evaluation functions P(t) and Q(t) by using an observation start time point as a reference point are referred to as first feature quantities.

The remaining two evaluation functions are given by a formula (3) and a formula (4).

$$P'(t) = |v(t - \tau) \cdot v(t)| \tag{3}$$

$$Q'(t) = \frac{|\lambda(t) - \lambda(t - \tau)|}{\lambda(t - \tau)} \tag{4}$$

In the formulas, r represents a period of time backward from a current time point. A value of τ can be set to, for example, 0.1 seconds, 0.5 seconds, and 1.0 seconds by taking into consideration, for example, a window size and the accuracy and efficiency of activity recognition. P'(t) is an evaluation function indicating changes in radio wave propagation from an immediately preceding signal. Q'(t) is an evaluation function indicating changes in the RSS from the immediately preceding signal. Feature quantities calculated by the evaluation functions P'(t) and Q'(t) that use an immediately preceding signal as a reference signal are referred to as second feature quantities. By using signals received 0.1 seconds, 0.5 seconds, and 1.0 seconds before the current time point, changes in radio wave propagation can be observed in detail throughout time windows during an activity.

Next, an activity is identified based on the four feature quantities by using a classifier (S12). As a classifier, a support vector machine (SVM), the k-nearest neighbors algorithm, and other methods can be used. The simplest classification method is to determine whether an activity is classified into one of class 1 and class 2 by using similarities between input feature quantities and learning data. In the present embodiment, at least four activities of "walking," "falling," "sitting down," and "being still" are classified. Therefore, a plurality of learning models are used. In addition to these four learning models, learning models such as transition from one activity to another activity, including sitting down after walking, falling after walking, and falling after standing still may be used. By storing feature quantities in a database and causing a computer to learn, learning models are established. Class membership probabilities of respective activities by the classifier are stored in a memory at the time of each update.

Next, by shifting the time window (S13), it is determined whether data processing is completed (S14). As long as there is data that needs to be processed (No in S14), steps S11 through S13 are repeated by shifting the time window. When there is no data that needs to be processed, the processing ends.

FIG. 3 illustrates an example of estimated activity transition by the processing flow in FIG. 2. By shifting a time window of a predetermined width, an activity is identified from the received data in each time window. An upper side of FIG. 3 illustrates actual activities and a lower side of FIG. 3 illustrates results identified for each time window by the conventional method and by the method according to the embodiment. The actual activities are walking, sitting down and being still. In such a method for estimating an activity by shifting a time window, false recognition sometimes occurs when a time window includes only a part of an activity. For example, time windows $w_k$ and $w_k+1$ include only a part of a "sitting down" activity. In this case, the time windows $w_k$ and $w_k+1$ fail to recognize "sitting down (S)" and an identified result indicating "falling (F)" is output.

Conversely, in the method according to the embodiment, in addition to P(t) and Q(t), P'(t) and Q'(t) are also used in order to calculate feature quantities. A signal received immediately (for example, 0.1 seconds) before a current time point is used as a reference signal to estimate an activity at the current time point. Accordingly, by observing signal changes in detail, an estimation result close to the actual activity can be obtained.

Even if an identified result by the method according to the embodiment is the same as, that of the conventional method, the identified result can be corrected by using a correction method, which will be described later. Accordingly, an identified result close to the actual activity can be obtained.

<Variation of Feature Quantity Extraction>

The above-described P'(t) and Q'(t) used to calculate feature quantities are evaluation functions in the time domain that use one or more reference time points in addition to a start time point of each time window. By extracting evaluation functions from Doppler signals, an activity can be estimated in a time-frequency plane. Accordingly, the accuracy of recognition accuracy can be improved.

FIG. 4 is a flowchart illustrating an example of the feature quantity extracting step S11 of FIG. 2. In FIG. 4, feature quantities are extracted by using frequency components included in received signals. First, by using quadrature detection, an I signal and a Q signal, which are 90 degrees out of phase, are extracted from a signal received by the array antenna 21 (S111). For each time window, a Fast Fourier Transform (FFT) is applied to an IQ signal including a real part and an imaginary part so that a Doppler signal is obtained (S112).

Figure 5A:
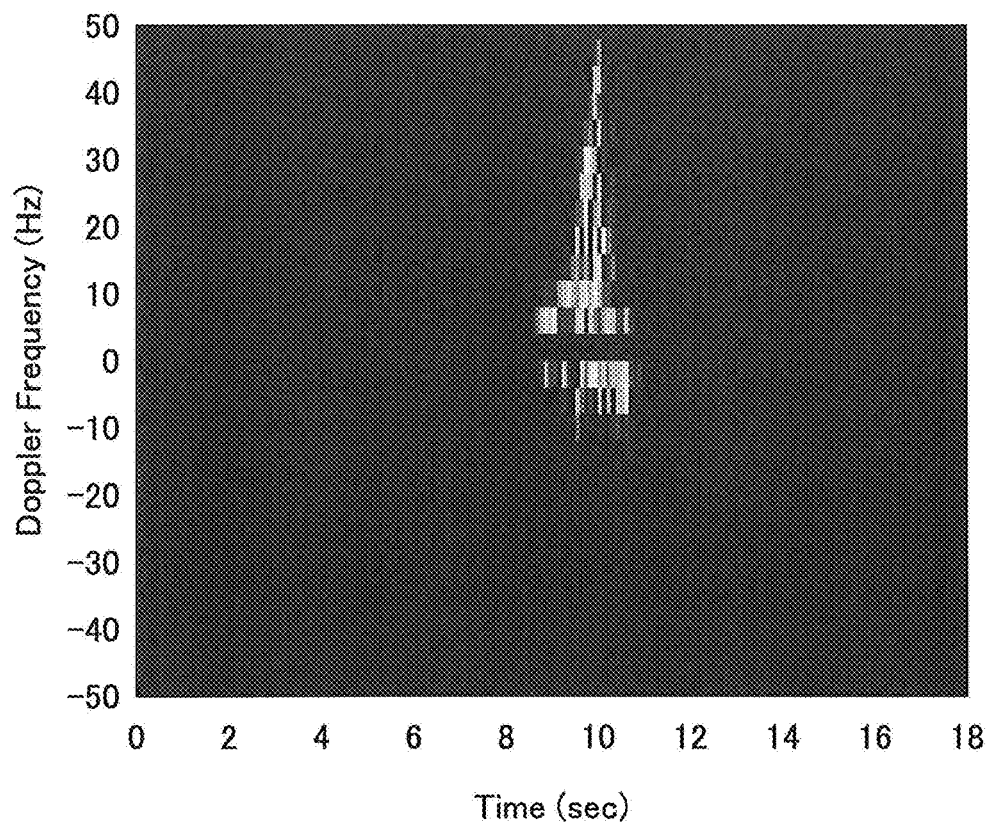
FIGS. 5A and 5B are frequency spectrograms of a Doppler signal at the time of a fall.
Figure 5B:
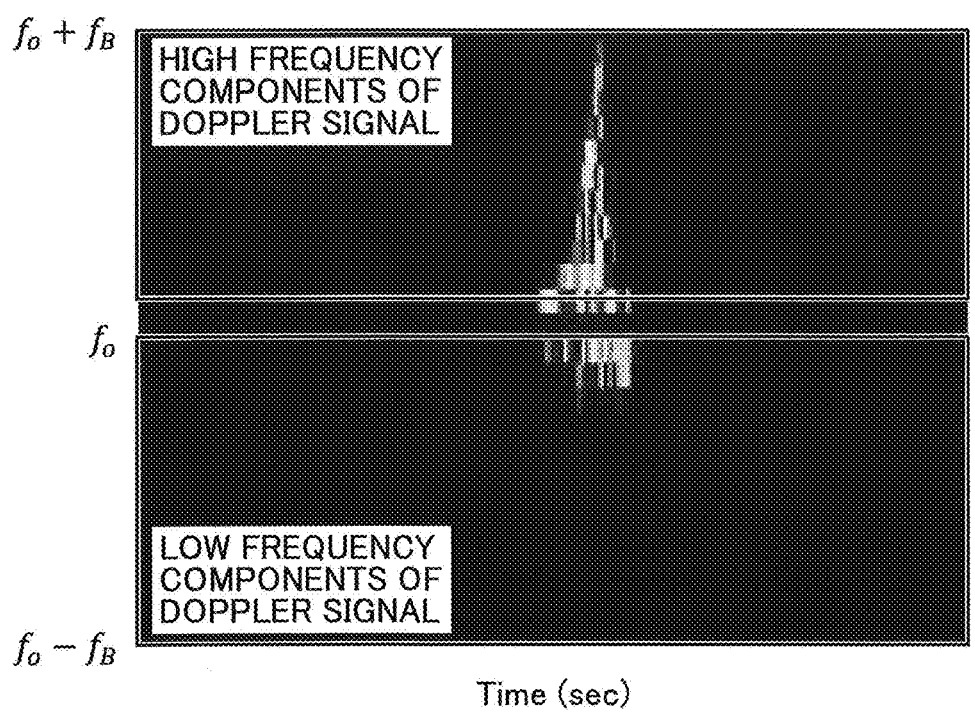

FIG. 5A illustrates a frequency spectrum obtained when a subject standing still has fallen down at a time point t of 1.0 seconds. As illustrated in FIG. 5B, the frequency spectrum includes a high frequency side (a positive Doppler frequency side) and a low frequency side (a negative Doppler frequency side) relative to a center frequency $f_0$. The direction of falling is detected based on the distribution and the shape of the frequency spectrum. The low Doppler frequency side is expressed by $-f_B$ and the high Doppler frequency side is expressed by $f_B$. In an example of FIG. 5B, the subject has fallen on the high Doppler frequency component side. Namely, the subject has fallen in the direction toward the array antenna 21.

Referring back to FIG. 4, P(t), Q(t), P'(t), and Q'(t) is calculated for each of the center Doppler frequency $f_0$, the high Doppler frequency components ranging from $f_0$ to $f_0+f_B$, and the low Doppler frequency components ranging from $f_0$ to $f_0-f_B$, (S113). As described above, P(t) and Q(t) are evaluation functions indicating changes from the signal received at an observation start time point of each time window. P'(t) and Q'(t) are evaluation functions indicating changes from an immediately preceding signal excluding a signal received at the observation start time point.

Figure 6:
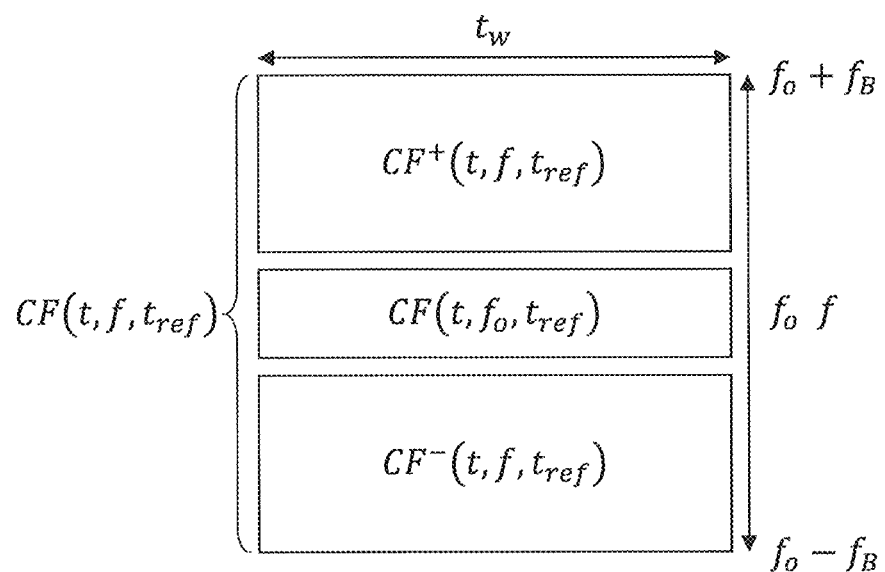
FIG. 6 is a schematic view illustrating evaluation functions including evaluation functions of a center frequency, a high-frequency component, and a low-frequency component according to the embodiment.

FIG. 6 is a schematic view illustrating the evaluation functions of the Doppler signal with respect to one time window after the FFT is performed. For simplicity, the evaluation functions P(t), Q(t), P'(t), and Q'(t) of the Doppler signal are collectively referred to as CF(t, f, $t_{ref}$), where f represents a Doppler frequency and $t_{ref}$ represents an immediately preceding reference time point. The time point $t_{ref}$ includes both an observation start time point $t_0$ and an immediately preceding reference time (t–τ). Examples of $t_{ref}$ include $t_0$, t–0.1 seconds, t–0.5 seconds, t–1.0 seconds, and t–1.5 seconds. The window width is expressed by $t_w$.

An evaluation function of the center frequency $f_0$ is expressed by CF(t, $f_0$, $t_{ref}$), an evaluation function of a high-frequency component is expressed by $CF^+$(t, f, $t_{ref}$) and an evaluation function of a low-frequency component is expressed by $CF^-$(t, f, $t_{ref}$). In the conventional method, only the center frequency component is used. However, by analyzing a Doppler signal, it becomes possible to use the high-frequency components and the low-frequency components. Accordingly, a two-dimensional analysis both in a time direction and a frequency direction can be performed.

Referring back to FIG. 4, P(t), Q(t), P'(t), and Q'(t) of the respective high-frequency components and P(t), Q(t), P'(t), and Q'(t) of the respective low-frequency components are summed in pairs (convolved) (S114).

Figure 7:
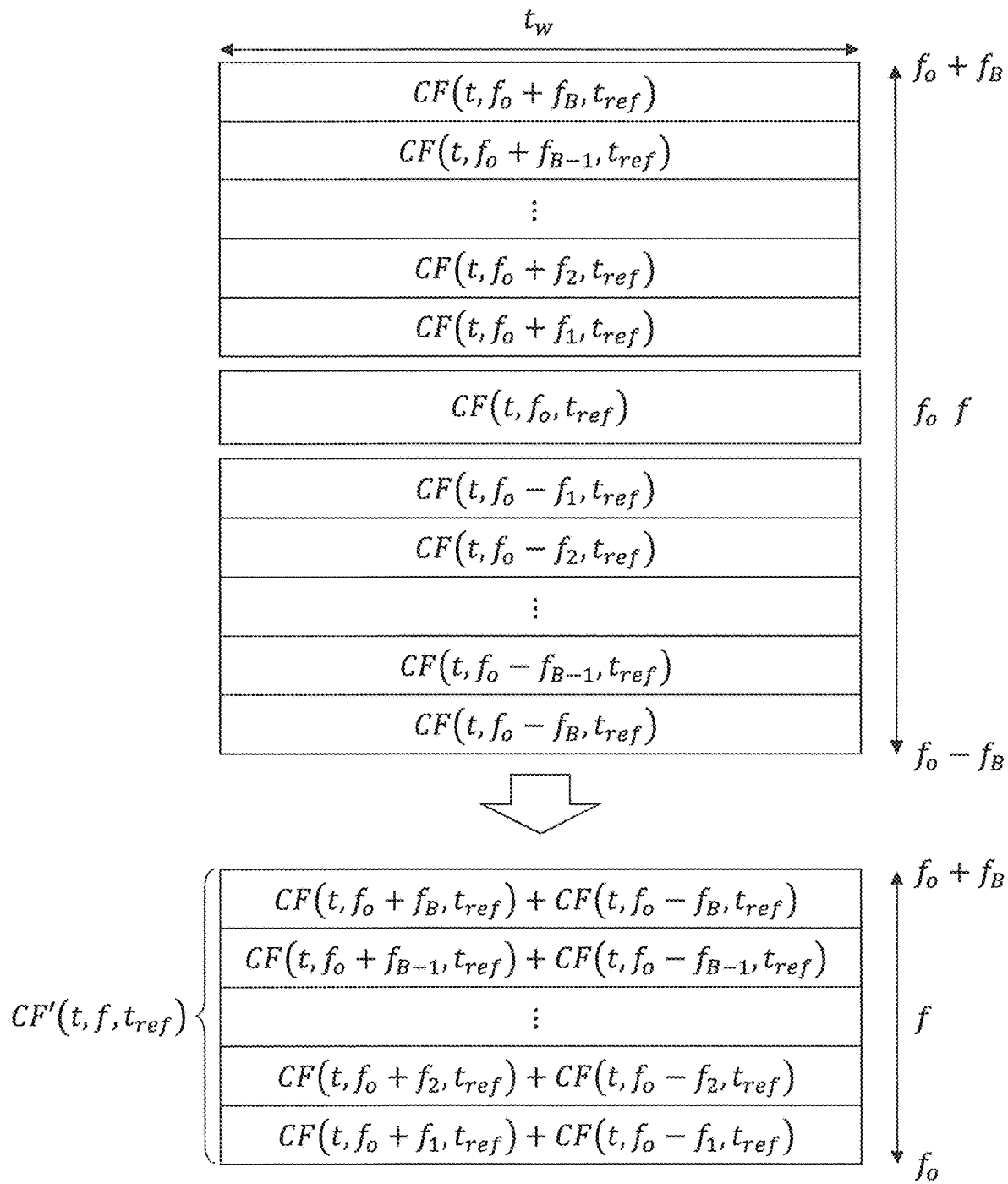
FIG. 7 is a drawing illustrating convolution of the high-frequency components and the low-frequency components.

FIG. 7 is a schematic view illustrating a convolution process. The Doppler frequency components from $f_0$ to $-f_B$ and to $+f_B$ (f=2×$f_B$) are divided into a plurality of subfrequency components. An evaluation function CF(t, $f_0+f_B$, $t_{ref}$) of the highest frequency component and an evaluation function CF(t, $f_0-f_B$, $t_{ref}$) of the lowest frequency component are summed. Further, an evaluation function CF(t, $f_0+f_{B-1}$, $t_{ref}$) of the second highest frequency component and an evaluation function CF(t, $f_0-f_{B-1}$, $t_{ref}$) of the second lowest frequency component are summed. In this way, evaluation functions of the high subfrequency components and the low subfrequency components are all summed in pairs, starting from the highest and lowest subfrequency components located furthest (or nearest) from the center frequency. The convolution process may be expressed as a folding process in which respective pairs of the low-frequency components and the high-frequency components are folded together with the center frequency $f_0$ as the center. As a result of the convolution process, the evaluation function CF'(t, f, $t_{ref}$) can be obtained. By performing convolution of the high frequency components and the low frequency components, the direction of motion (toward or away from the array antenna 21) has less influence on the characteristics of the signals.

Figure 8:
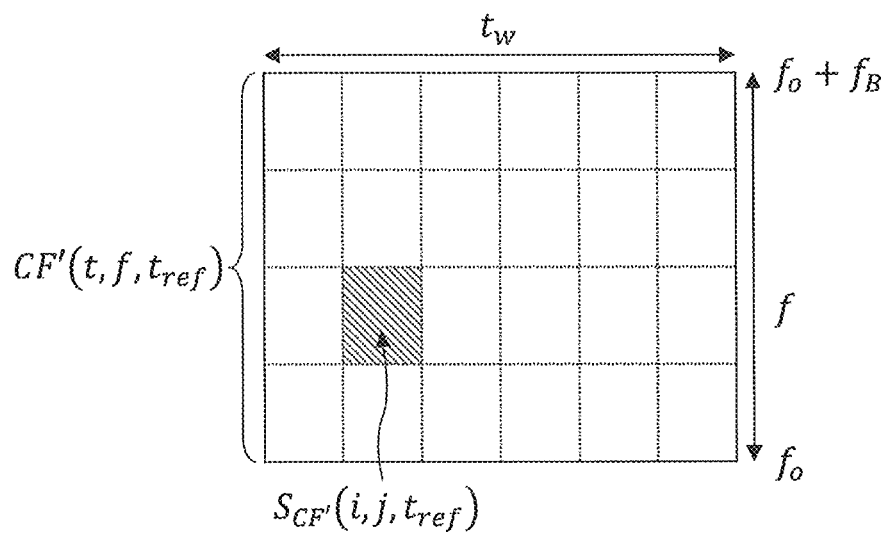
FIG. 8 is a drawing illustrating divided regions of an evaluation function after the convolution.

FIG. 8 is another variation illustrating feature quantity extraction. The evaluation function CF'(t, f, $t_{ref}$) is divided both in the time direction and in the frequency direction. The number of divided regions in the time direction is expressed by Nt. The number of divided regions in the frequency direction is expressed by Nf. In an example of FIG. 8, Nt=6 and Nf=4. The evaluation function CF'(t, f, $t_{ref}$) is divided into 6 regions in the time direction and 4 regions in the frequency direction. In the respective divided regions, an evaluation function SCF'(i, j, $t_{ref}$) is calculated, where i is an integer from 1 to Nt and j is an integer from 1 to Nf.

A feature quantity vector for one divided area is expressed by SCF' (i, j, $t_{ref}$)/S($t_{ref}$). S($t_{ref}$) is calculated by the following formula:

[Formula 5]

$$S(t_{ref}) = \sum_{i=1}^{N_t} \sum_{j=1}^{N_f} S_{CF'}(i, j, t_{ref}) \tag{5}$$

In a case where the number of reference signals used is expressed by $Nt_{ref}$, the number of feature quantities in one window is Nt×Nf×$Nt_{ref}$×2. In this way, changes in the radio wave propagation can be estimated in detail both in the time direction and in the frequency direction.

<Correction of Identified Results>

FIG. 9 is a drawing illustrating correction of an identified result. In order to correct an identified result without setting an experimental threshold for each activity, class membership probabilities by a classifier are used. A classifier such as the SVM classifies data into classes based on similarities between the input data and learning data. A class membership probability indicates the probability of input data belonging to each class. When the similarities between input data and learning data are high, the input data has high probability of belonging to a class to which the learning data belongs. When an identified result includes unlikely activity transition such as sitting down after falling, the identified result is corrected by using class membership probabilities.

As with the case of the time windows wk and wk+1, when a time window includes only a part of an activity, the class membership probability of the activity becomes low. After data is processed for all time windows and all activities are classified, a correction method is applied in accordance with the following rules.

(1) In a case where a class membership probability is less than 0.5, an identified result at a time point t is corrected to an activity identified at an immediately preceding time point (t−1). A low class membership probability means that the reliability of the classified (or identified) activity is low.
(2) In a case where an activity excluding walking and stillness is identified followed by walking, the activity excluding walking and stillness is corrected to walking. Walking tends to be wrongly recognized as other activities when a person changes directions while walking. Therefore, a result classified into unlikely activity transition is corrected to walking.
(3) In a case where an unlikely activity is identified in a time window, all activities in that time window are corrected to an activity having the highest class membership probability in that time window. By preliminarily storing types of unlikely activity patterns in a memory, it becomes easy to determine whether an unlikely activity is included in an identified result.
(4) In cases other than (1) to (3), classified (identified) results by the classifier are applied.

In an example of FIG. 9, an activity of sitting down immediately after falling illustrated in the time windows wk and wk+1 is unlikely to be performed (rule (3)). In general, after falling, people lie still for a while. In the example of FIG. 9, the identified results of "falling" in the time windows wk and wk+1 are corrected to "sitting down," which have the highest class membership probability of 0.8 among all the results in the time windows.

<Verification Experiment>

FIGS. 10A and 10B are drawings illustrating environments used in a verification experiment. As illustrated in plan views of FIG. 10A and FIG. 10B, an activity area 41 of 0.95 m×1.9 m is provided at the center of each room. In the rooms, the receiver (Rx) 20 receives radio waves transmitted from the transmitter (Tx) 10. As illustrated in FIG. 1, the receiver 20 is equipped with the array antenna 21 and is coupled to the information processing apparatus 30 such as a personal computer (PC). A metal board 40 is provided in front of the transmitter 10 such that a non-line of sight (NLOS) environment is created. In order to assess the robustness of the method according to the embodiment against directions of motion, each activity transition is performed in at least two directions.

In the room of FIG. 10A, the following 4 types of activity transition are tested.
(1) Fall test 1: Stand at respective positions A, B, and C, and fall in the activity area 41, and then lie on the floor (stand still→fall→lie on the floor).
(2) Fall test 2: Walk around the activity area 41, fall in the activity area 41 from the respective positions A, B, and C, and then lie on the floor (walk→fall→lie on the floor).
(3) Non-fall test 1: Stand at the position C and sit on a chair in the activity area 41 (stand still→sit down).
(4) Non-fall test 2: Walk around the activity area 41 and sit on the chair at the position C (walk→sit down).

In the room of FIG. 10B, the following 4 types of activity transition are tested.
(1) Fall test 2: Walk around the activity area 41, fall in the activity area 41 from the respective positions A, B, and C, and then lie on the floor (walk→fall→lie on the floor).
(2) Non-fall test 2: Walk around the activity area 41 and sit on the chair at the position C (walk→sit down).
(3) Non-fall test 3: Walk to the position C and lie in the activity area 41 (walk→lie on the floor).
(4) Non-fall test 4: Walk to the position C and sit on the floor in the activity area 41 (walk→sit on the floor).

In the experiment, the fall tests are performed 108 times and the non-fall tests are performed 60 times. In total, the fall and non-fall tests are performed 168 times. In each test, the evaluation functions P(t), Q(t), P'(t), and Q'(t) based on Doppler signals are used to identify activities.

FIG. 11 is a drawing illustrating parameters used in the experiment. The number of antenna elements of the array antenna 21 of the receiver 20 is 4. A sampling frequency is 4 kHz. A frequency $f_0$ of the transmitter 10 is 2.47 GHz. The number of subjects is 4. A window width $t_w$ is 3 seconds. A Doppler frequency is $f_0 \pm 80$ Hz. Signals received 0.1 seconds before, 0.5 seconds before, 1.0 seconds before, and 1.5 seconds before a current time point are used as reference signals to calculate the evaluation functions P'(t) and Q'(t).

A plurality of types of activities are extracted based on experimental data obtained from the tests, which are performed for 168 times in the environments of FIGS. 10A and 10B by using the parameters of FIG. 11.

Figures 12A, 12B:
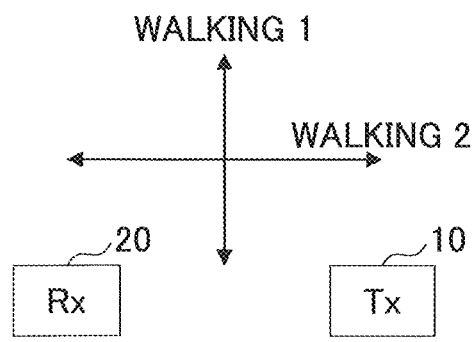
FIGS. 12A and 12B are drawings illustrating types of activities used in the experiment.

FIG. 12A illustrates 9 types of activities extracted from activity transition patterns extracted from the tests performed for 168 times. Also, multiple activities are extracted from single fall test or from a single non-fall test. Therefore, the total number of the extracted activities is 288. For example, walking 1 and walking 2 in two different directions are extracted from a single non-fall test. Also, "lying on the floor after walking" and "being still" are extracted from a single non-fall test.

Walking 1 and walking 2 as non-fall activities represent walking in different directions with respect to the positions of the transmitter 10 and the receiver 20 disposed as illustrated in FIG. 12B. Walking 1 represents walking in a direction perpendicular to a straight line between the transmitter 10 and the receiver 20. Walking 2 represents walking in a direction parallel to the straight line between the transmitter 10 and the receiver 20.

The 288 activities are extracted from the 168 activity transition patterns, and the following (i) and (ii) are evaluated.
(i) Fall detection accuracy (FDA) of the 288 respective activities
(ii) Fall detection accuracy (FDA') of the 168 respective activity transition patterns when the respective activities are used as learning data.

Figure 13:
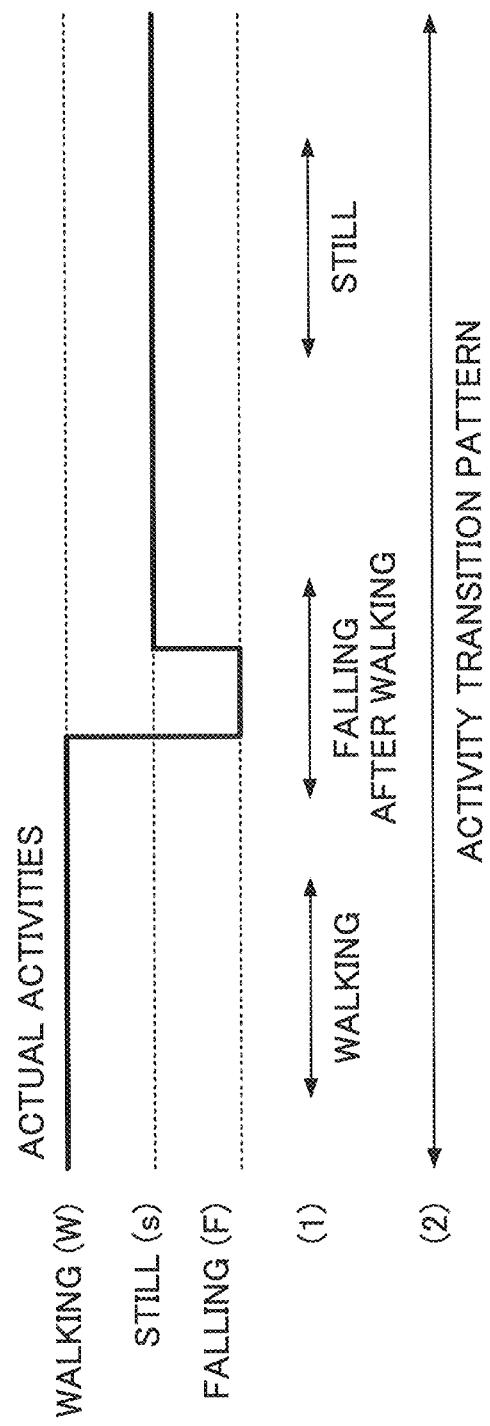
FIG. 13 is a drawing illustrating an example of activities and an activity transition pattern.

FIG. 13 is a drawing illustrating an example of activities of the above-described evaluation item (1) and an activity transition pattern of the above-described evaluation item (ii). For example, during an actual activity, when a person walks, falls, and then is not moving, three activities "walking," "falling after walking," and "being still" are extracted, respectively. Conversely, the activity transition pattern includes data indicating that the person "falls after walking and is not moving."

In order to calculate the fall detection accuracy of the respective activities of the evaluation item (i), the respective activities are each determined to be falls or non-falls by using the SVM. The fall detection accuracy is expressed by a formula (6).

$$FDA = (N_{TP} + N_{FN})/\text{total number of activities} \quad (6)$$

In the formula 6, $N_{TP}$ represents the number of activities that include falls and are correctly classified into falls. $N_{FN}$ represents the number of activities that do not include falls and are correctly classified into non-falls. In order to assess the fall detection accuracy, a cross-validation method is used, and test data of each subject is identified by using learning data of other subjects.

The fall detection accuracy (FDA') of the activity transition patterns of the evaluation item (ii) are calculated by a formula (7) by using the respective activities as learning data. The activity transition patterns are classified by shifting the window.

$$FDA' = (N'_{TP} + N'_{FN})/\text{total number of activity transition patterns} \quad (7)$$

In the formula 7, $N'_{TP}$ represents the number of activity transition patterns including falls that are classified into falls at least once. $N'_{FN}$ represents the number of activity transition patterns not including falls that are not classified into falls even once.

FIGS. 14A and 14B illustrate the fall detection accuracy of the respective activities of the evaluation item (i) calculated by using the method according to the embodiment, compared to the conventional method. In the conventional method, only the evaluation functions P(t) and Q(t) are used to calculate feature quantities. In the method according to the embodiment, the evaluation functions P(t), Q(t), P'(t), and Q'(t) are used to calculate feature quantities such that activities are identified. Values in parentheses indicate the number of the correctly classified activities and the number of tests performed for the respective activities.

When an actual activity is "falling after standing still," while the fall detection accuracy of the conventional method is 86.1%, the fall detection accuracy of the method according to the embodiment is improved to 97.2%. Also, when an actual activity is "falling after walking," while the fall detection accuracy of the conventional method is 76.3%, the fall detection accuracy the method according to the embodiment is as precise as 98.6%.

Although non-fall activities such as activities after walking are difficult to be correctly identified, such non-fall activities can be identified with high accuracy in the present embodiment. Changes in radio wave propagation are not significant when a person performs an activity after walking, as compared to when the person performs an activity after standing still. In the conventional method, feature quantities are extracted by using only an observation start time point of each window as a reference. Therefore, such activities cannot be detected with high accuracy. In the conventional method, the accuracy of correctly classifying activities not including falls into non-falls is 58.3% for "sitting down after standing still" and is 29.2% for "sitting down after walking". In the method according to the embodiment, remarkably high accuracies of 100% and 95.8% are achieved. Further, in the conventional method, the detection accuracy of "sitting on the floor after walking" is 75.3% and the detection accuracy of "lying on the floor after walking" is 33.3%. In the method according to the embodiment, the detection accuracy of "sitting on the floor after walking" is 100%, which is three times higher than that of the convention method. Also, the detection accuracy of "lying on the floor after walking" is 66.6%, which is two times higher than that of the convention method.

In the method according to the embodiment, the detection accuracy of "lying on the floor after walking" is relatively poor. This is because the magnitude and the speed of this activity are similar to those of a fall activity. The other activities are detected at high accuracy.

FIGS. 15A through 15C are drawings illustrating effects of correcting the activity transition patterns by using the method according to the embodiment as compared to the conventional method. FIG. 15A illustrates the fall detection accuracy of the method according to the embodiment in which results identified by using the four evaluation functions are corrected by using class membership probabilities. FIG. 15B illustrates the fall detection accuracy of the conventional method in which results identified by using the two evaluation functions P(t) and Q(t) are corrected by using thresholds set for respective activities. FIG. 15C illustrates the fall detection accuracy in a case where activity transition identified by using the two evaluation functions P(t) and Q(t) are not corrected.

In the correction method according to the embodiment, the number of activity transition patterns that include falls and are correctly classified into falls is 107 out of 108. The fall detection accuracy is 99.1%. The number of activity transition patterns that do not include falls and are correctly classified into non-falls is 55 out of 60. The fall detection accuracy is 91.7%. In the embodiment, by correcting identified results, both falls and non-falls can be identified with stably high accuracy.

In the conventional method illustrated in FIG. 15B, identified results are corrected by using the experimental thresholds set for respective activities. Although the accuracy of activity transition patterns that include falls and are correctly classified into falls is 100%, the accuracy of activity transition patterns that do not include falls and are correctly classified into non-falls is 65%.

As illustrated in FIG. 15C, when the correction method is not applied, the accuracy of activity transition patterns that include falls and are correctly classified into falls is 100%. However, the percentage of activity transition patterns that do not include falls, but are incorrectly classified into falls is also 100%. It is assumed that when a time window includes only a part of an activity, the activity is incorrectly identified as a fall.

In this way, by applying the correction method according to the embodiment, it is possible to provide highly accurate fall detection without setting experimental thresholds for respective activities.

FIGS. 16A and 16B are drawings illustrating effects of using feature quantities according to the embodiment. The use of feature quantities according to the embodiment have effects of calculating evaluation functions in the time-frequency plane (hereinafter referred to as a "Doppler region" for convenience) and using at least one immediately preceding signal as a reference signal.

As illustrated in FIG. 16A, in the conventional method that uses only the evaluation functions P(t) and Q(t) to extract feature quantities, the fall detection accuracy of fall activities (including both falling after standing still and falling after walking) is 79.17%. The values of the fall detection accuracy are obtained from the tests, which are performed for 168 times by using only the evaluation functions P(t) and Q(t) under the conditions illustrated in FIGS. 10A and 10B and FIG. 11. Conversely, by calculating P(t) and Q(t) in the Doppler region, the fall detection accuracy can be improved to 92.01%.

FIG. 16B illustrates an effect of using, in addition to the Doppler signals as illustrated in FIG. 16A, the evaluation functions P'(t) and Q'(t) indicating changes from at least one immediately preceding signal used as a reference signal. The constant fall detection accuracy can be obtained by using one of signals received 0.1 seconds before, 0.5 seconds before, 1.0 seconds before, and 1.5 seconds before a current time point. In a case where the signal received 0.1 seconds before the current time point is used as a reference signal, a difference in a propagation state from the current time point is not significant. In a case where the signals 0.5 seconds, 1.0 seconds, and 0.5 seconds before the current time point is used, the fall detection accuracy of 93% or more can be obtained. In a case where all the four signals are used as reference signals, a detection accuracy of 97.57% can be obtained by observing changes in radio wave propagation in detail. By combining the effect of using feature quantities that represent changes from at least one immediately preceding signal with the effect of using the evaluation functions calculated in the Doppler region, the detection accuracy improves by 18.4%, as compared to the detection accuracy of the conventional method (79.17%). The use of Doppler signals and the use of at least one immediately preceding signal as a reference signal both contribute to the detection accuracy, separately.

FIG. 17 illustrates an effect of dividing the Doppler region into regions where the evaluation functions are calculated. $N_f$ represents the number of divided Doppler regions in the frequency direction. $N_f$ is varied by 1, 2, 4, and 5. $N_t$ represents the number of divided Doppler regions in the time direction. $N_t$ is varied by 1, 3, 6, and 10. The fall detection accuracy is calculated for every combination of the divided regions. As can be seen from the table in FIG. 17, by dividing the Doppler region into an appropriate number of regions, highly accurate activity recognition becomes possible. In particularly, by dividing the Doppler region into 4 regions or greater in the frequency direction and into 3 regions or greater in the time direction, the fall detection accuracy exceeding 97% can be obtained. This effect is obtained by estimating changes in the radio wave propagation in the frequency direction and in the time direction in detail.

Figure 18:
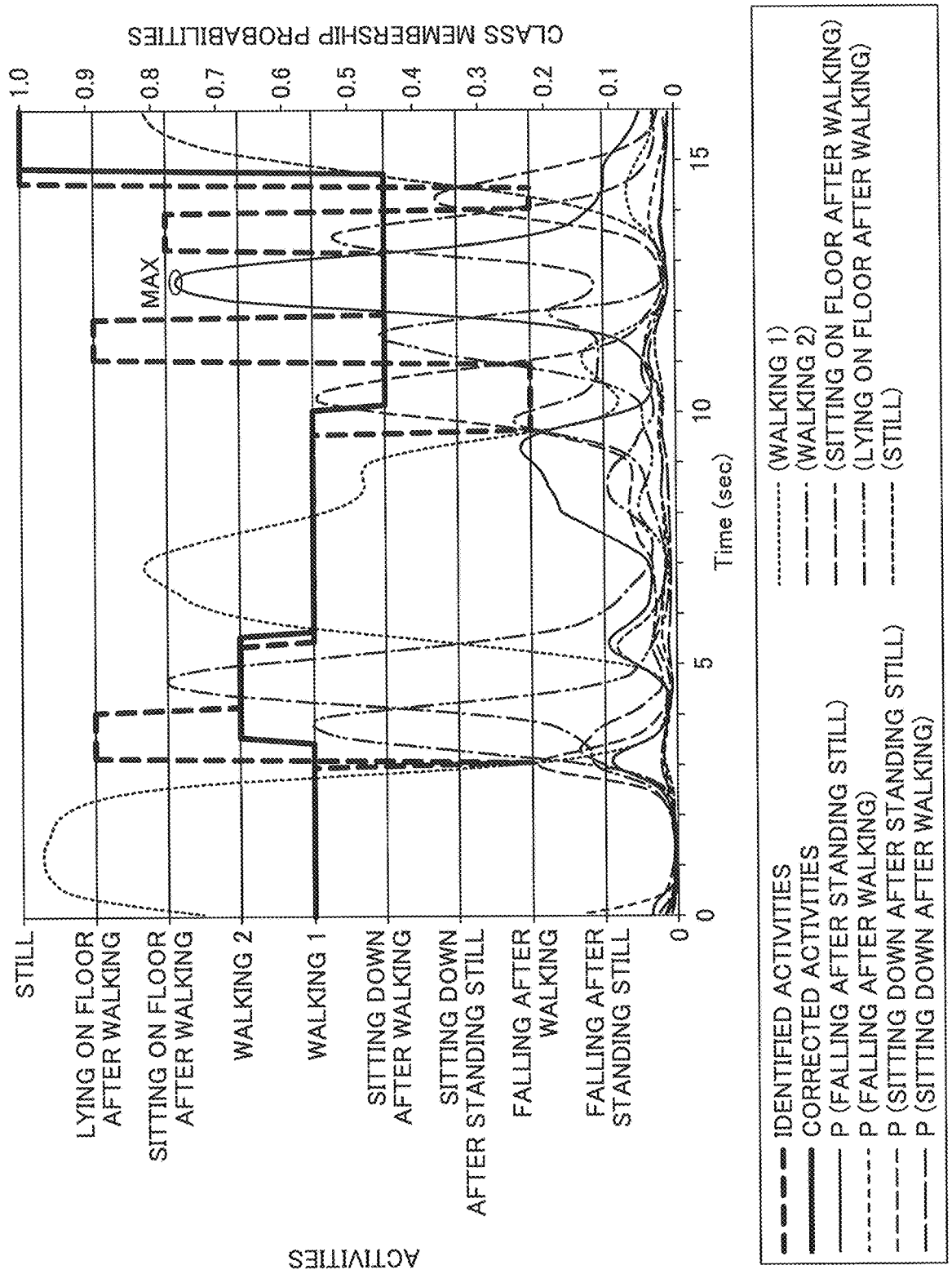
FIG. 18 is a drawing illustrating an example of estimated results and corrected results of activity transition according to the embodiment.

FIG. 18 illustrates an identified result and a corrected result of activity transition when a person walks, from near the transmitter 10 in the room of FIG. 10B, around the activity area 41 in a counterclockwise direction, and then sits down on the chair in the activity area 41 at the position C. The identified result is indicated by a dashed thick line and the corrected result is indicated by a continuous thick line. By applying at least one of the rules (1) through (4) described for FIG. 9, the identified result of the activity transition can be corrected so that the identified result becomes closer to the actual activity transition.

From 3 seconds to 5 seconds in FIG. 18, activities "falling after walking 1" and "lying on the floor" are identified followed immediately by walking. Therefore, by applying the rule (2), the results including "falling after walking" and "lying on the floor after walking" are both corrected to "walking".

From 1.0 seconds to 1.5 seconds, after "falling after walking," the following activity transition is identified: a non-fall (lying on the floor after walking)→a non-fall (sitting down after walking)→a non-fall (sitting on the floor after walking)→a fall (falling after walking). However, this activity transition is unlikely under normal circumstances. Therefore, by applying the rule (3), all the activities are corrected to the activity "sitting down after walking" that has the highest class membership probability.

In the example of FIG. 18, by applying the rule (2) and the rule (3), it is possible to prevent activity transition not including a fall from being incorrectly detected activity transition including a "fall."

Figure 19:
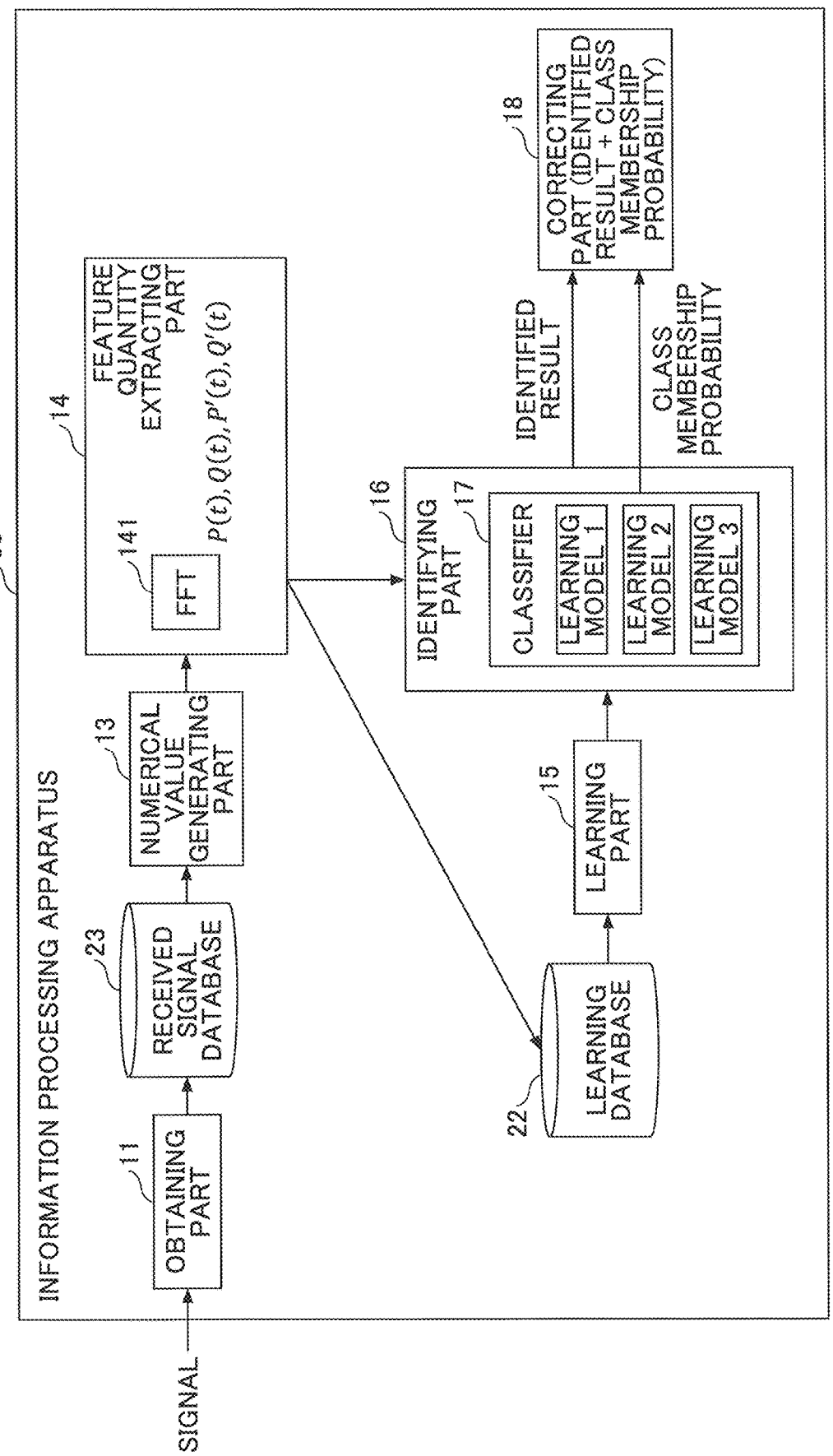
FIG. 19 is a schematic diagram illustrating an information processing apparatus according to the embodiment.

FIG. 19 is a schematic diagram illustrating the information processing apparatus 30 of the activity recognition system 1 according to the embodiment. The information processing apparatus 30 may be implemented by any electronic apparatus including at least a processor and a memory. For example, the information processing apparatus 30 may be a signal processor provided inside the receiver 20. The information processing apparatus 30 includes an obtaining part 11, a received signal database (DB) 23, a numerical value generating part 13, a feature quantity extracting part 14, a learning database (DB) 22, a learning part 15, an identifying part 16, and a correcting part 18.

The obtaining part 11 obtains signals received by the respective antenna elements of the array antenna 21 of the receiver 20. The received signals are sequentially stored in the received signal database 23. The numerical value generating part 13 generates time-series numerical data representing the intensity and the channel status of the received signals.

In an example of FIG. 19, the feature quantity extracting part 14 includes a FFT 141. The FFT 141 performs the Fourier transform of the received time-series numerical data for each window such that the four feature quantities P(t), Q(t), P'(t), and Q'(t) are calculated in the Doppler region. Although the FFT 141 is not required, the fall detection accuracy can be improved by using Doppler signals as described above. Also, feature quantity extracting part 14 may include a dividing part that divides the Doppler region into regions of appropriate sizes. In this case, the four feature quantities P(t, f), Q'(t, f), P'(t, f), and Q'(t, f) are calculated in the respective divided regions in both the time direction and the frequency direction. The respective feature quantities may be calculated by smoothing values obtained in a plurality of divided regions.

The data obtained by the feature quantity extracting part 14 is input into the identifying part 16, and at the same time, stored in the learning database 22. The learning part 15 learns a relationship between a pattern of feature quantities that have been input and an activity by using the data stored in the learning database 22. Further, the learning part 15 updates learning data stored in the learning database 22, and supplies the learning data (identified patterns) to the identifying part 16.

The identifying part 16 includes a classifier 17. The classifier 17 compares the pattern of the four feature quantities with the learning data such that the activity is identified for each window. In a case where the classifier 17 uses the SVM method to classify activities, one or more learning models may be used. As an example, an activity is first identified as a non-moving activity or a moving activity by using a learning model 1. When the activity is identified as a non-moving activity, the activity expressed by the four feature quantities is identified as falling, sitting down, lying on the floor, and being still by using a learning model 2. When the activity is identified as a moving activity, the activity expressed by the four feature quantities is identified as walking, falling, or sitting down by using a learning model 3. A result (an estimated activity or estimated class) identified by the identifying part 16 is output to the correcting part 18, together with a class membership probability of the activity.

The correcting part 18 corrects the identified result by applying at least one of the above-described correction rules (1) through (4). By proving the correcting part 18, it is possible to present sudden activity transition that does not include a fall from being incorrectly identified as a fall. It is also possible to correct unlikely activity transition to the most likely activity transition. Results output from the correcting part 18 may be transmitted from the information processing apparatus 30 to another apparatus as activity recognition data. Alternatively, the information processing apparatus 30 may be provided with an alarm function that allows an alarm to be output when a fall is detected.

According to at least one embodiment, it is possible to accurately recognize activity transition including falling after walking.

As described above, according to the activity recognition scheme and method of the embodiment, without setting experimental thresholds for respective activities, activities can be identified with high accuracy. The above-described embodiment is only an example of the present invention, and various variations and modifications may be made. As least one of the transmitter 10 and the receiver 20 may be movable. The transmitter 10 and the receiver 20 may be placed at any location in a room. Also, a plurality of pairs of the transmitter 10 and the receiver 20 may be placed at a plurality of locations in such a manner that signal data received by the array antennas 21 of the respective receivers 20 may be processed by the single information processing apparatus 30.

Further, the present invention is not limited to these embodiments, but various variations and modifications may be made without departing from the scope of the present invention.

What is claimed is:

1. An activity recognition system for identification of an activity of a subject, the activity recognition system comprising:
   a transmitter configured to transmit a radio wave; and
   a receiver configured to receive the radio wave by an array antenna;
   a processor that is configured to
   extract a feature quantity from a signal received by the array antenna, wherein the feature quantity represents changes of radio wave propagation and received signal strength by using a signal received at an observation start time point as a reference signal;
   sum a low-frequency component and a high-frequency component of the feature quantity; and
   identify the activity based on the sum of the low-frequency component and the high-frequency component of the feature quantity,
   wherein the processor is configured to convert the signal received by the array antenna into a frequency domain signal, and calculate a two-dimensional feature quantity Mat represents a signal change both in a time direction and in a frequency direction, and
   the processor is configured to identify the activity based on the two-dimensional feature quantity.

2. The activity recognition system according to claim 1, wherein the feature quantity extracting part is configured to divide a tune-frequency plane into a plurality of subregions, and calculate the two-dimensional feature quantity in each of the divided subregions.

3. The activity recognition system according to claim 1, wherein the processor is configured to calculate a feature quantity for each of a center frequency, a high-frequency component of the frequency domain signal, and a low-frequency component of the frequency domain signal, and calculate the two-dimensional feature quantity by summing the feature quantity in the low-frequency component of the frequency domain signal and the feature quantity in the high-frequency component of the frequency domain signal.

4. An activity recognition method comprising:
   disposing a transmitter configured to transmit a radio wave and a receiver including an array antenna at predetermined positions;
   receiving the radio wave by the array antenna;
   extracting a feature quantity from a signal received by the array antenna, wherein the feature quantity represents changes of radio wave propagation and received signal strength by using a signal received at an observation start time point as a reference signal;
   summing a low-frequency component and a high-frequency component of the feature quantity; and
   identifying an activity based on the sum of the low-frequency component and the high-frequency component of the feature quantity by using a classifier,
   wherein the extracting the feature quantity includes converting the signal received by the array antenna into a frequency domain signal, calculating a two-dimensional feature quantity that represents a change in radio wave propagation both in a dine direction and in a frequency direction, and identifying the activity based on the two-dimensional feature quantity by using the classifier.

* * * * *